United States Patent
Moore, Jr. et al.

(10) Patent No.: US 12,058,218 B2
(45) Date of Patent: Aug. 6, 2024

(54) MANAGEMENT OF OPENING A CONNECTION TO THE INTERNET FOR SMART ASSISTANT DEVICES

(71) Applicant: ARRIS Enterprises LLC, Suwanee, GA (US)

(72) Inventors: Richard Moore, Jr., Harleysville, PA (US); Charles Peter Cheevers, Alpharetta, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/517,870

(22) Filed: Nov. 3, 2021

(65) Prior Publication Data

US 2022/0159079 A1 May 19, 2022

Related U.S. Application Data

(60) Provisional application No. 63/115,161, filed on Nov. 18, 2020.

(51) Int. Cl.
| | |
|---|---|
| *H04L 67/14* | (2022.01) |
| *G06F 3/01* | (2006.01) |
| *G06F 3/16* | (2006.01) |
| *G08B 7/06* | (2006.01) |

(52) U.S. Cl.
CPC .............. *H04L 67/14* (2013.01); *G06F 3/017* (2013.01); *G06F 3/167* (2013.01); *G08B 7/06* (2013.01)

(58) Field of Classification Search
CPC .................................. H04L 67/14; G06F 3/167
See application file for complete search history.

(56) References Cited

U.S. PATENT DOCUMENTS

| | | | |
|---|---|---|---|
| 9,397,978 B1* | 7/2016 | Cha ...................... | H04L 63/101 |
| 10,541,865 B1* | 1/2020 | Brophy .................. | G06Q 30/08 |
| 2004/0016242 A1* | 1/2004 | Song .................. | H04L 61/4511 |
| | | | 236/51 |
| 2007/0268121 A1* | 11/2007 | Vasefi .................... | H04N 7/181 |
| | | | 348/E7.086 |
| 2009/0286568 A1* | 11/2009 | Cheriyath ........... | H04L 41/0813 |
| | | | 455/552.1 |

(Continued)

OTHER PUBLICATIONS

International Search Report and Written Opinion of the International Searching Authority issued Feb. 16, 2022, in International (PCT) Application No. PCT/US2021/057828.

(Continued)

*Primary Examiner* — Viet D Vu
(74) *Attorney, Agent, or Firm* — Wenderoth, Lind & Ponack, L.L.P.

(57) ABSTRACT

A smart assistant control interface for verifying security and privacy in a multiple smart assistant environment. The smart assistant control interface is presented on a display device of the network device. The smart assistant control interface allows a user to enter rules for managing Internet access through a gateway device by one or more smart assistant. The rules are sent to the gateway device. A request for Internet access status of one or more smart assistant devices is provided to the gateway device from the smart assistant control interface. The Internet access status of the one or more smart assistant devices is received from the gateway device and presented on the display device.

20 Claims, 5 Drawing Sheets

(56) References Cited

U.S. PATENT DOCUMENTS

| | | | |
|---|---|---|---|
| 2015/0282217 A1* | 10/2015 | Kim | H04W 8/26 |
| | | | 709/223 |
| 2016/0267773 A1* | 9/2016 | Martin | G08B 25/004 |
| 2016/0330042 A1* | 11/2016 | Andersen | H04L 12/282 |
| 2017/0290074 A1* | 10/2017 | Lee | H04W 48/18 |
| 2018/0034869 A1* | 2/2018 | Ellbogen | H04L 65/1093 |
| 2018/0295176 A1 | 10/2018 | Sundaresan et al. | |
| 2018/0302377 A1* | 10/2018 | Rose | H04W 12/08 |
| 2019/0124198 A1* | 4/2019 | Lacey | H04M 15/66 |
| 2019/0212730 A1 | 7/2019 | Jones et al. | |
| 2019/0377505 A1 | 12/2019 | Yaghmour | |

OTHER PUBLICATIONS

International Preliminary Report on Patentability and Written Opinion issued Jun. 1, 2023 in International Application No. PCT/US2021/057828.

\* cited by examiner

MANAGEMENT OF OPENING A CONNECTION TO THE INTERNET FOR SMART ASSISTANT DEVICES

BACKGROUND

The subject matter of the present disclosure relates generally to a tool allowing users to verify security and privacy in a smart assistant environment.

A smart assistant device uses software installed in a smart device, such as a smart speaker or a smart phone, that can perform tasks or services, or answer questions. Smart assistants use voice queries and a natural-language user interface to answer questions, make recommendations, and perform actions by delegating requests to a set of Internet services. Smart assistants provide a link between users and smart technology software. Smart assistants may be used to control smart plugs, smart thermostats and similar devices.

Smart assistant devices provide these various services by using, for example, smart microphones that listen for a wake word to become active and perform certain tasks. Alexa, Siri and Google Assistant are examples of smart assistants. Alexa by Amazon is part of the Echo and the Dot. Google Assistant is part of Google Home. Siri is a smart assistant that is part of Apple Inc.'s various operating systems. There are many other smart assistants that operate on a wide variety of technology platforms. Consumers are becoming accustomed to the having multiple smart assistants.

A problem with smart assistant devices involves privacy issues for the users and people in areas where smart assistants may be used. People are becoming more worried about such devices listening to private conversations as well as performing the intended function of listening for wake words and task commands. The basis for such concern is concern about smart assistants opening a connection to the cloud and Internet services when not responding to a wake word and task commands.

SUMMARY

An aspect of the present disclosure involves providing a smart assistant control interface for verifying security and privacy in a multiple smart assistant environment.

A user interface is presented on a display device of the network device. Rules for managing Internet access through a gateway device by one or more smart assistant devices are entered using the user interface. The rules are sent to the gateway device. The user interface is then used to send a request to the gateway device to obtain Internet access status of one or more smart assistant devices. The Internet access status of the one or more smart assistant devices is received form the gateway device and presented on the display device.

The Internet access status includes traffic information associated with Internet access by the one or more smart assistant devices.

One or more of light emitting diodes (LEDs), and at least one speaker may also be provided on the network device. The Internet access status of the one or more smart assistant devices may be presented using one or more of the LEDs representing execution status of each of the one or more smart assistant devices, a visual indication on the display device of the execution status of each of the one or more smart assistant devices, and an audio message played through the at least one speaker to indicate the execution status of each of the one or more smart assistant devices.

Access to the Internet by the one or more smart assistant devices through the gateway device may be managed based on detecting various inputs detected by the one or more smart assistant devices, which may include one or more of detection of voice inflection associated with a task command, and at least one of a wake word and non-verbal input that are interpreted using command interpretation rules. The non-verbal input may include input associated with a gesture.

Execution control rules are provided via the user interface. The execution control rules are sent to the gateway device, wherein the execution control rules define handling of, by the gateway device, distribution information received with a task command from the one or more smart assistant devices, the distribution information defining distribution of the task command to a separate device for execution by the separate device. The rules for managing access to the Internet may also include presence detection rules that define operation of the gateway based on receiving presence information from one of the one or more smart assistant devices identifying a source of a task command proximate to the one of one of the one or more smart assistant devices, wherein the presence information enables the gateway device to process the task command without receiving the at least one of a wake word and non-verbal input. The presence information may be associated with at least one of Wi-Fi motion detection, Bluetooth proximity detection, Bluetooth low energy detection, RF detection, and camera motion detection. The presence information may also be used to determine a location of the one of the one or more smart assistant devices, and enables the task command to be executed without location information provided with the task command. The Internet access status indicates receipt, by the gateway, of at least one of a wake word and non-verbal input, and a task command for performing a maintenance operation, the maintenance operation performed when the at least one of the wake word and non-verbal input are associated with authorization for performing the maintenance operation.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to providing a smart assistant control interface for verifying security and privacy in a multiple smart assistant environment.

Figure 1:
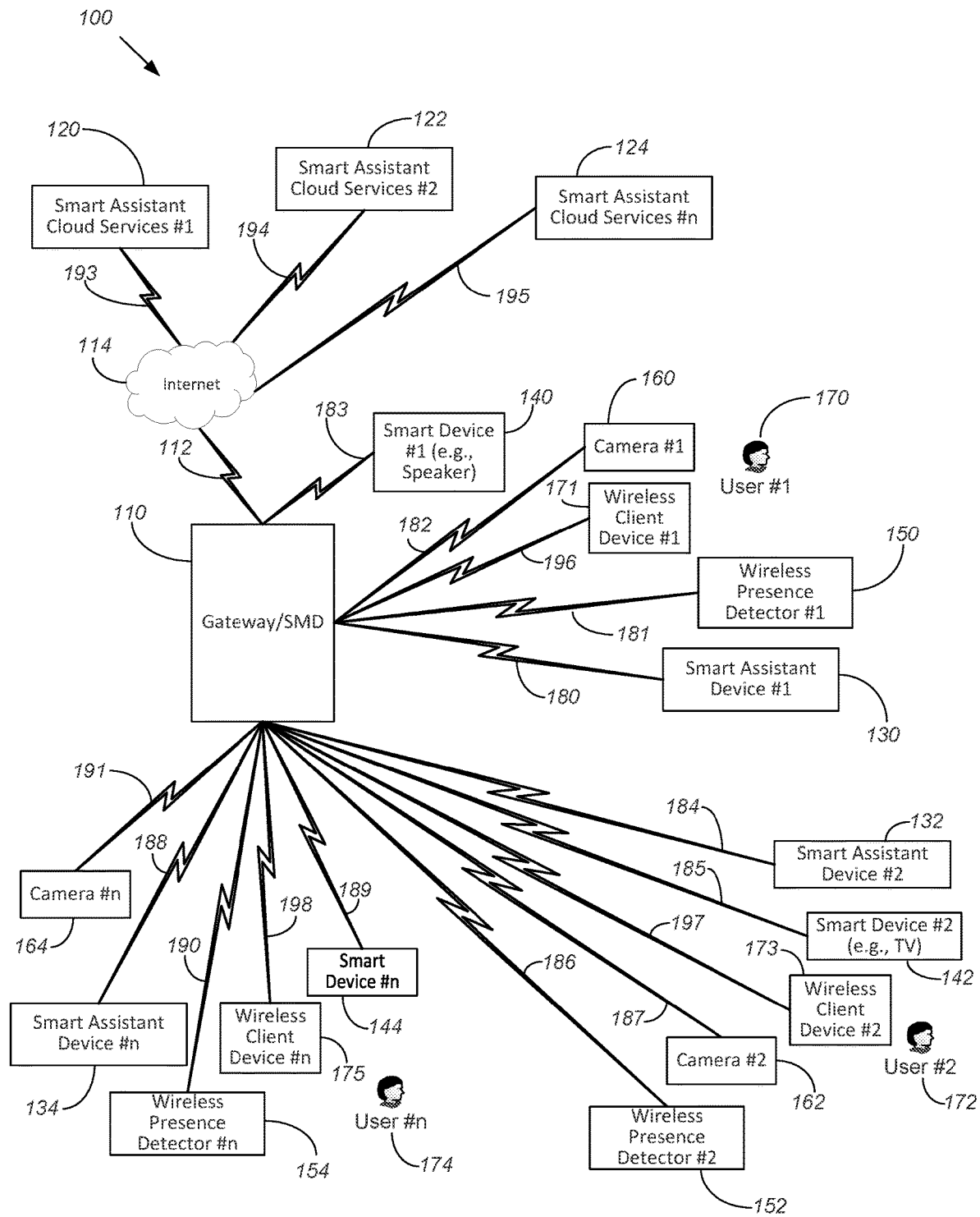
FIG. 1 is a schematic diagram of a multiple smart assistant environment.

As shown in FIG. 1, the elements of the Smart Assistant Environment 100 include an Internet Access Device such as a Gateway or Smart Media Device (SMD) 110 that is connected to the Internet 114 via connection 112. Herein, the Internet Access Device will be referred to as a Gateway 110. The Gateway 110 may communicate with Smart Assistant Cloud Services 120, 122, 124 via connections 193, 194, 195, respectively. Gateway 110 is connected to Smart Assistant Devices 130, 132, 134 via connections 180, 184, 188, respectively. The Gateway is connected to Smart Devices 140, 142, 144 via connections 183, 185, 189, respectively. Smart Assistant Devices 130, 132, 134 may control Smart Devices 140, 142, 144 via the use of wake words, task commands, and non-verbal input. Wireless Presence Detectors 150, 152, 154 may be used to provide data to the Gateway 110 and/or Smart Devices 140, 142, 144 via connections 181, 186, 190, respectively. Cameras 160, 162, 164 may provide data to Gateway 110 and/or Smart Devices 140, 142, 144 via connections 182, 187, 191, respectively. FIG. 1 also shows users 170, 172, 174 positioned in the Smart Assistant Environment 100. Although not shown in FIG. 1, it is understood that Smart Assistant Devices 130, 132, 134, Smart Devices 140, 142, 144, Wireless Presence Detectors 150, 152, 154, and Cameras 160, 162, 164 may communicate with one another.

Smart Devices 140, 142, 144, Smart Devices 140, 142, 144, Wireless Presence Detectors 150, 152, 154, and Cameras 160, 162, 164 may be connected in one or more wireless networks (e.g., private, guest, iControl, backhaul network, or Internet of things (IoT) network) within the smart assistant environment 100. Additionally, there could be some overlap between the wireless devices, (e.g., Smart Devices 140, 142, 144, Smart Devices 140, 142, 144, Wireless Presence Detectors 150, 152, 154, and Cameras 160, 162, 164) in different networks. That is, one or more network devices could be located in more than one network. For example, one or more of Smart Devices 140, 142, 144, Smart Devices 140, 142, 144, Wireless Presence Detectors 150, 152, 154, and Cameras 160, 162, 164 could be located both in a private network, and also included in a backhaul network or an iControl network.

Commands received from users 170, 172, 174 at Smart Devices 140, 142, 144 may be provided to Gateway 110 and then forwarded to Smart Assistant Cloud Services 120, 122, 124 to process the commands and the provided through Gateway 110 to one or more Smart Devices 140, 142, 144, or back to Smart Devices 140, 142, 144. Wireless Client Devices 171, 173, 175 communicate with Gateway 110 via connections 196, 197, 198, respectively. As will be explained below, Gateway 110 may include a wake word engine that is isolated from the Internet 114 by an Internet access manager. The Gateway 110 provides, to at least one of Wireless Client Devices 171, 173, 175, an application/tool having a smart assistant control interface for monitoring Internet access by any of the wireless devices (e.g., Smart Devices 140, 142, 144, Smart Devices 140, 142, 144, Wireless Presence Detectors 150, 152, 154, and Cameras 160, 162, 164), and for allowing a user (e.g., Users 170, 172, 174) to program the Gateway 110 with command interpretation rules as explained below.

The connection 112 between the Gateway 110 and Internet 114, connections 193, 194, 195 between the Internet 114 and Smart Assistant Cloud Services 120, 122, 124 may be implemented using a wide area network (WAN), a virtual private network (VPN), metropolitan area networks (MANs), system area networks (SANs), a DOCSIS (Data Over Cable Service Interface Specification) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connections 112, 193, 194, 195 can further include as some portion thereof a broadband mobile phone network connection, an optical network connection, or other similar connections. For example, connection 112 can also be implemented using a fixed wireless connection that operates in accordance with, but is not limited to, 3rd Generation Partnership Project (3GPP) Long Term Evolution (LTE) or 5G protocols. It is also contemplated by the present disclosure that connections 112, 193, 194, 195 is capable of providing connections between the network device 110 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example.

Connections 180-191 between Gateway 110 and the wireless devices (e.g., Smart Devices 140, 142, 144, Smart Devices 140, 142, 144, Wireless Presence Detectors 150, 152, 154, and Cameras 160, 162, 164) can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, 60 GHz, etc. Additionally, the connections 180-191 can be implemented using a wireless connection that operates in accordance with, but is not limited to, Radio Frequency for Consumer Electronics (RF4CE) protocol, ZigBee protocol, Z-Wave protocol, or IEEE 802.15.4 protocol. It is also contemplated by the present disclosure that the connections 180-191 can include connections to a media over coax (MoCA) network. One or more of Connections 180-191 can also be a wired Ethernet connection.

Wireless Client Devices 171, 173, 175 may be, for example, hand-held computing devices, personal computers, electronic tablets, smart phones, smart speakers, IoT devices, iControl devices, portable music players with smart capabilities capable of connecting to the Internet, cellular networks, and interconnecting with Gateway 110, and Smart Assistant Devices 130, 132, 134 via Wi-Fi and Bluetooth. Additionally, the Wireless Client Devices 171, 173, 175 can be a TV, an IP/QAM STB or an SMD that is capable of decoding audio/video content, and playing over over-the-top (OTT) or MSO provided content received through the network device 110.

Connections 196, 197, 198 between Gateway 110 and Wireless Client Devices 171, 173, 175 are implemented through a wireless connection that operates in accordance with, but is not limited to, any IEEE 802.11 protocols. Additionally, Connections 196, 197, 198 between the network device 110 and Wireless Client Devices 171, 173, 175 may also be implemented through a WAN, a local area network (LAN), a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. The connection 110 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, 60 GHz, etc. One or more of the connections 110 can also be a wired Ethernet connection.

Figure 2:
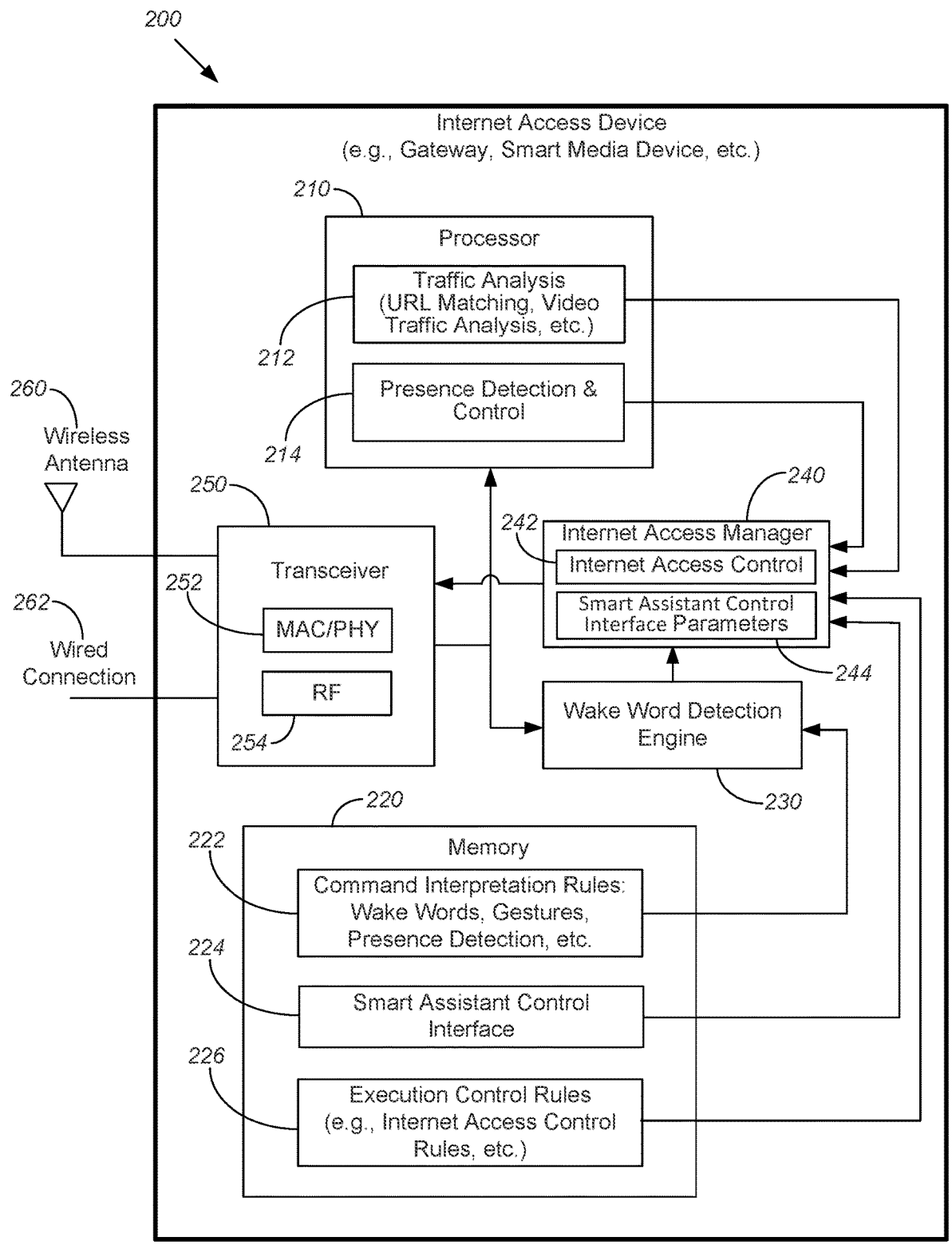
FIG. 2 is a block diagram of an Internet Access Device for controlling Internet access by smart assistant devices.
Figure 3:
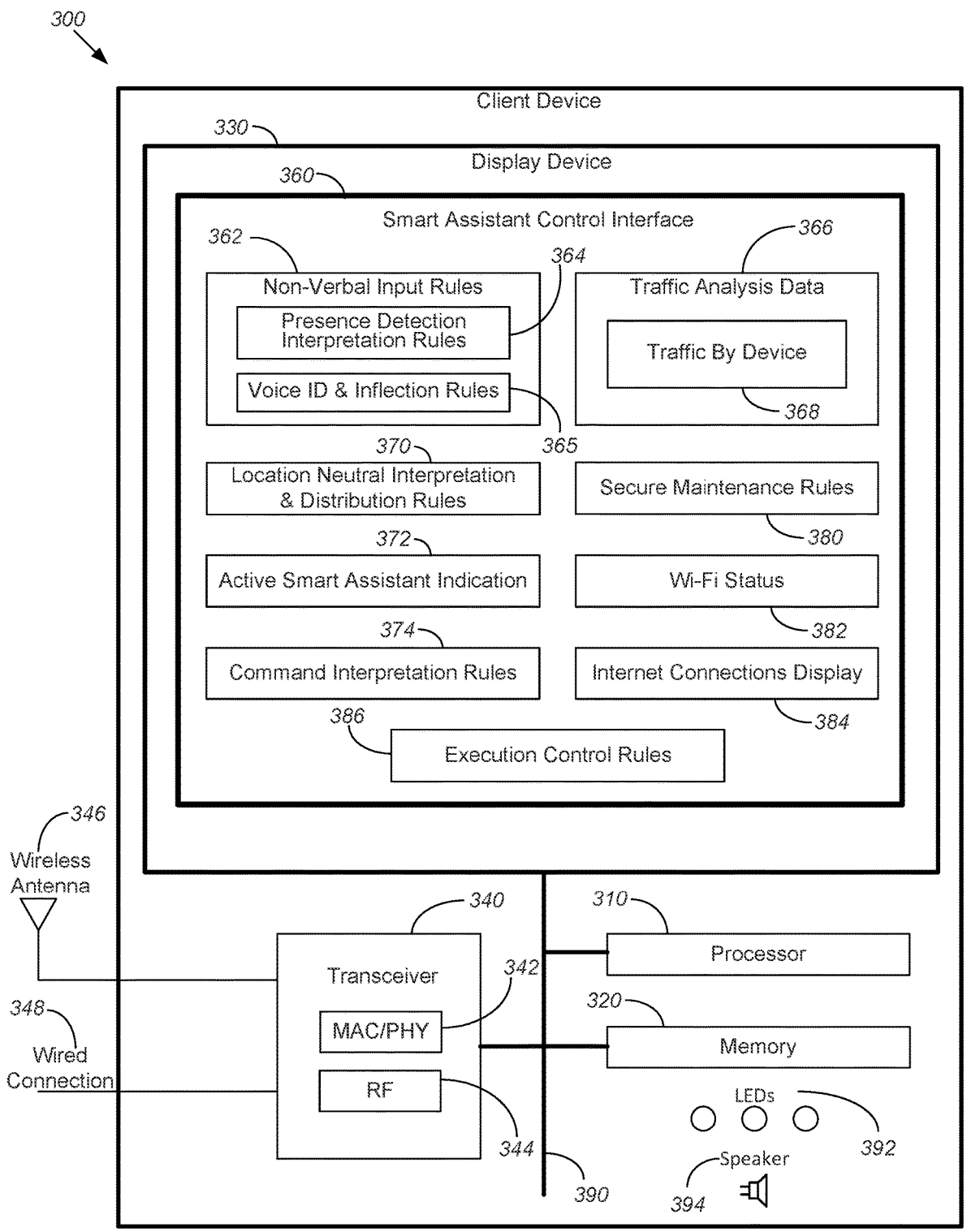
FIG. 3 is a block diagram of a client device implementing a smart assistant control interface.
Figure 4:
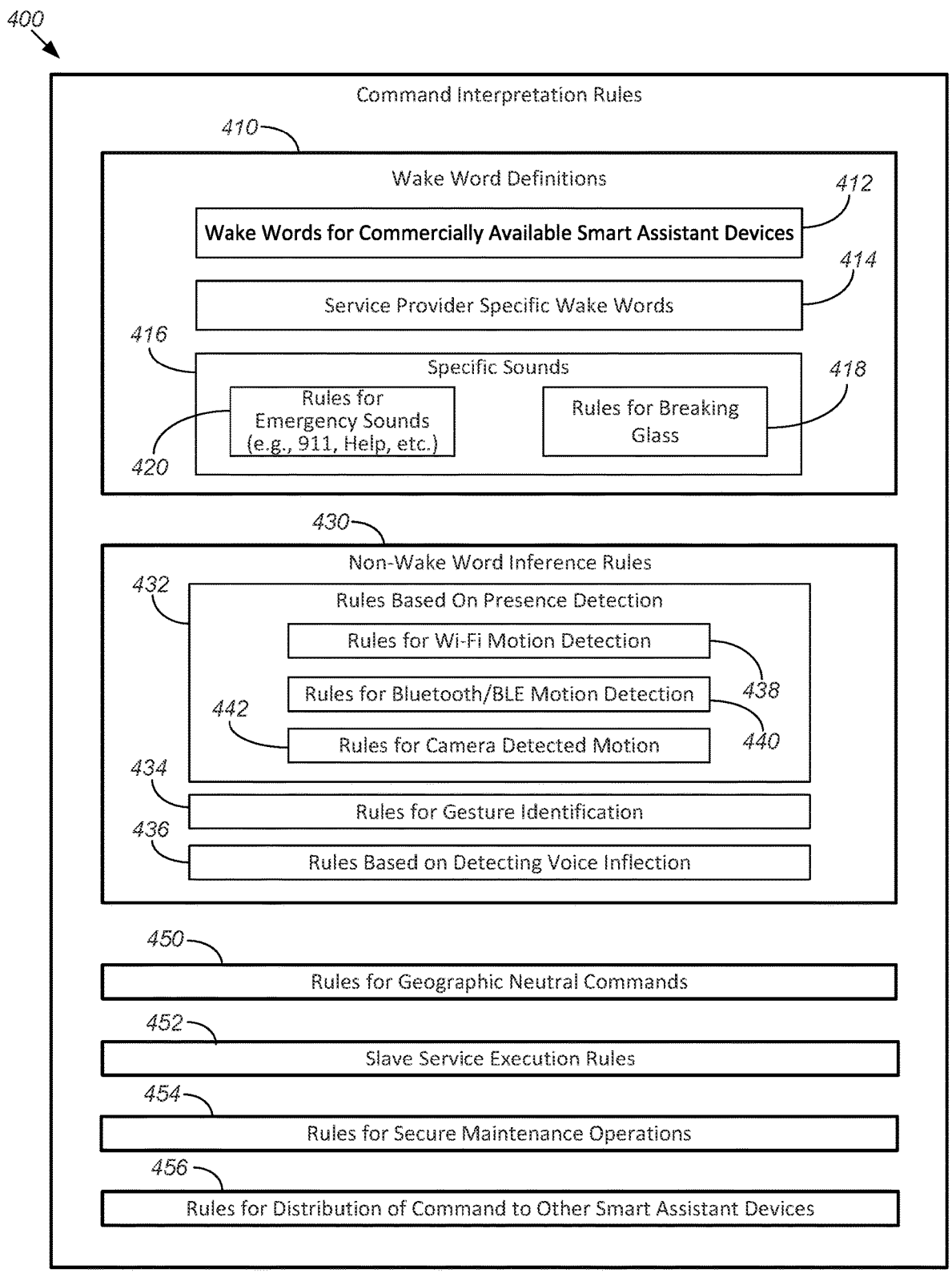
FIG. 4 is a diagram showing command interpretation rules implemented by an Internet access device.

A detailed description of the exemplary internal components of the Gateway 110 and Wireless Client Devices 171, 173, 175 shown in FIG. 1 will be provided in the discussion of FIGS. 2-4. However, in general, it is contemplated by the present disclosure that Gateway 110, Wireless Client Devices 171, 173, 175, Smart Devices 140, 142, 144, Smart Devices 140, 142, 144, Wireless Presence Detectors 150, 152, 154, and Cameras 160, 162, 164 may include electronic components or electronic computing devices operable to receive, transmit, process, store, and/or manage data and information associated with the smart assistant environment 100, which encompasses any suitable processing device adapted to perform computing tasks consistent with the execution of computer-readable instructions stored in a memory or a computer-readable recording medium.

Further, any, all, or some of the computing components in that Gateway 110, Wireless Client Devices 171, 173, 175, Smart Devices 140, 142, 144, Smart Devices 140, 142, 144, Wireless Presence Detectors 150, 152, 154, and Cameras 160, 162, 164 may be adapted, where applicable, to execute any operating system, including Linux, UNIX, Windows, MacOS, DOS, and ChromOS as well as virtual machines adapted to virtualize execution of a particular operating system, including customized and proprietary operating systems. Gateway 110, Wireless Client Devices 171, 173, 175, Smart Devices 140, 142, 144, Smart Devices 140, 142, 144, Wireless Presence Detectors 150, 152, 154, and Cameras 160, 162, 164 may be further equipped with components to facilitate communication with other computing devices over the one or more network connections to local and wide area networks, wireless and wired networks, public and private networks, and any other communication network enabling communication in the smart assistant environment 100.

As mentioned above, and explained in more detail with reference to FIG. 4 below, a smart assistant control interface is presented on a display device of one or more of Wireless Client Devices 171, 173, 175. Rules for managing Internet access through Gateway 110 by one or more of the Smart Assistant Devices 130, 132, 134 are entered using the smart assistant control interface. The rules are sent to the gateway 110. The smart assistant control interface is then used to send a request to the Gateway 110 to obtain Internet access status of one or more Smart Assistant Devices 130, 132, 134. The Internet access status of the one or more Smart Assistant Devices 130, 132, 134 is received form the Gateway 110 and presented on the display device of the Wireless Client Devices 171, 173, 175. The Internet access status includes traffic information associated with Internet access by the one or more Smart Assistant Devices 130, 132, 134.

Wireless Client Devices 171, 173, 175 may present Internet access status by different techniques. For example, one or more of light emitting diodes (LEDs), and at least one speaker may also be provided on the Wireless Client Devices 171, 173, 175. The Internet access status of the one or more Smart Assistant Devices 130, 132, 134 may be presented using one or more of the LEDs representing execution status of each of the one or more Smart Assistant Devices 130, 132, 134, a visual indication on the display device of the Wireless Client Devices 171, 173, 175 showing execution status of each of the one or more Smart Assistant Devices 130, 132, 134, and an audio message played through the at least one speaker of the Wireless Client Devices 171, 173, 175 to indicate the execution status of each of the one or more Smart Assistant Devices 130, 132, 134.

Access to the Internet by the one or more Smart Assistant Devices 130, 132, 134 through the Gateway 110 may be managed based on detecting various inputs detected by the one or more Smart Assistant Devices 130, 132, 134, which may include one or more of detection of voice inflection associated with a task command, and at least one of a wake word and non-verbal input that are interpreted using command interpretation rules. The non-verbal input may include input associated with a gesture.

Execution control rules are provided via the smart assistant control interface. The execution control rules are sent to the Gateway 110, wherein the execution control rules define handling of, by the Gateway 110, distribution information received with a task command from the one or more Smart Assistant Devices 130, 132, 134, the distribution information defining distribution of the task command to a separate device for execution by the separate device. The rules for managing access to the Internet may also include presence detection rules that define operation of the Gateway 110 based on receiving presence information from one or more of Wireless Presence Detectors 150, 152, 154, and Cameras 160, 162, 164.

The presence information from one or more of Wireless Presence Detectors 150, 152, 154, and Cameras 160, 162, 164 may be used to identify a source of a task command proximate to the one of one of the one or more Smart Assistant Devices 130, 132, 134, wherein the presence information enables the Gateway 110 to process the task command without receiving the at least one of a wake word and non-verbal input. The presence information may be associated with at least one of Wi-Fi motion detection, Bluetooth proximity detection, Bluetooth low energy detection, RF detection, and camera motion detection. The presence information may also be used to determine a location of the one of the one or more Smart Assistant Devices 130, 132, 134, and enables the task command to be executed without location information provided with the task command. The Internet access status indicates receipt, by the Gateway 110, of at least one of a wake word and non-verbal input, and a task command for performing a maintenance operation, the maintenance operation performed when the at least one of the wake word and non-verbal input are associated with authorization for performing the maintenance operation.

FIG. 2 is a block diagram of an Internet Access Device 200, such as a Gateway or SMD, for controlling Internet access by smart assistant devices.

In FIG. 2, the Internet Access Device 200 includes Processor 210, Memory 220, Wake Word Detection Engine 230, Internet Access Manager 240 and Transceiver 250. Processor 210 implements Traffic Analysis 212 and Presence Detect6ion and Control 214. Memory 220 includes Command Interpretation Rules 222, code for implementing a Smart Assistant Control Interface 224 on a client device, and Execution Control Rules 226. Internet Access Manager 240 provides Internet Access Control 242 using Smart Assistant Control Interface Parameters 244. Internet Access Control 242 and Smart Assistant Control Interface Parameters 244 are configured using input from the Traffic Analysis 212, Presence Detection and Control 214, Smart Assistant Control Interface 224, and Execution Control Rules 226. The Command Interpretation Rules 222 are provided to the Wake Word Detection Engine 230 for determining how to process wake words, task commands, and non-verbal input received from a smart assistant.

Transceiver 250 processes received data into a format that Processor 210 may use and data from the Internet Access Manager 240 that may be transmitted to one or more of smart assistant cloud services, smart assistant devices, and wireless client devices. Data may be transmitted and received via Wireless Antenna 260 and Wired Connection 262. Transceiver 250 includes MAC/PHY 252 and RF segment 254. MAC/PHY 252 provides wireless IP network communication (such as Wi-Fi) via Wireless Antenna 260 and wired network communication (such as Ethernet or MoCA) via Wired Connection 262. MAC/PHY 252 supports wireless Wi-Fi connections using 2.4 GHz bands, 5 GHz bands, 6 GHz bands, 60 GHz bands, etc. MAC/PHY 252 implements physical layer functions to provide physical access for signals communicated over a wireless link, and controls transmission/receipt of data packets via Wireless Antenna 252 and Wired Connection 262. MAC/PHY 252 implements physical layer functions to provide physical access for signals. RF segment 254 processes signals for RF transmission and received RF signals. Both Wireless Antenna 260 and Wired Connection 262 may be used for RF signals. Thus, Transceiver 250 includes RF processing to support 802.11 Wi-Fi protocols for communication using 2.4 GHz bands, 5 GHz bands, 6 GHz bands, 60 GHz, etc., as well as Ethernet, Cable TV, Satellite services, MoCA, etc.

A wireless client device may download Smart Assistant Control Interface 224 from Internet Access Device 200. Smart Assistant Control Interface 224 is then implemented on a wireless client device to configure rules for managing Internet access through Internet Access Device 200 by one or more of the smart assistant devices. Processor 210 uses Traffic Analysis 212 to obtain Internet access status of one or more smart assistant devices for presentation on a display device of the smart assistant control interface implemented on the wireless client device. Access to the Internet by the one or more smart assistant devices may be managed based on detecting various inputs detected by the one or more smart assistant devices, which may include one or more of detection of voice inflection associated with a task command, and at least one of a wake word and non-verbal input that are interpreted using command interpretation rules. The non-verbal input may include input associated with a gesture.

Execution Control Rules 226 are provided to the Internet Access Device 200 via the smart assistant control interface. The Execution Control Rules 226 are received by the Internet Access Device 200, wherein the Execution Control Rules 226 define handling of, by the Internet Access Device 200, distribution information received with a task command from the one or more smart assistant devices. The distribution information defines distribution of the task command to a separate device for execution by the separate device. Command Interpretation Rules 222 are used to manage to the Internet may also include presence detection rules that define operation of the Internet Access Device 200 based on receiving presence information from wireless presence detectors and cameras.

The presence information from one or more of wireless presence detectors and cameras may be used to identify a source of a task command proximate to the one of one of the one or more smart assistant devices, wherein the presence information enables the Internet Access Device 200 to process the task command without receiving the at least one of a wake word and non-verbal input. The presence information may be associated with at least one of Wi-Fi motion detection, Bluetooth proximity detection, Bluetooth low energy detection, RF detection, and camera motion detection. The presence information may also be used to determine a location of the one of the one or more smart assistant devices, and enables the task command to be executed without location information provided with the task command. The Internet access status indicates receipt, by the Internet Access Device 200, of at least one of a wake word and non-verbal input, and a task command for performing a maintenance operation, the maintenance operation performed when the at least one of the wake word and non-verbal input are associated with authorization for performing the maintenance operation.

Wake Word Detection Engine 230 sits isolated from the Internet. The Wake Word Detection Engine 230 is not meant to be listening to speech all the time. Rather, Wake Word Detection Engine 230 is meant to be waiting to hear specific word or words to open up that connection between the Wake Word Detection Engine 230 and the Internet. Multiple wake words are already pre-programmed in smart assistant devices, wherein some of those are for existing AI engines, some of them are for service providers keywords, and some of them are actually things like the sound of breaking glass, someone saying help, etc. However, the Internet Access Manager 240 only opens an Internet connection for a smart device based on Internet Access Control 242. Internet Access Manager 240 may also receive Smart Assistant Control Interface Parameters 244 from a wireless client which may also be used by the Internet Access Manager 240 when deciding whether to open an Internet connection for a smart assistant.

Thus, the Internet Access Device 200 is able to provide data to the smart assistant control interface on a client device that shows that the Internet connection is protected, i.e., the Internet connection it is only opened up for a smart assistant when the Internet Access Device 200 decides to open it up in a multiple assistant environment.

For example, smart assistant devices, e.g., Google, Amazon, and Cortana, are positioned behind the Internet Access Manager 240. The Internet Access Manager 240 can be thought of as a switch that uses Internet Access Control 242 and Smart Assistant Control Interface Parameters 244 to ensure that no packets in a multiple assistant environment will flow through to the Internet unless the Internet Access Manager 240 decides to open the Internet connection to them based on a specific determination made in the Internet Access Manager 240 as opposed to being decided by the smart assistant devices.

FIG. 3 illustrates a Client Device configured with a Smart Assistant Control Interface.

In FIG. 3, Client Device 300 includes a Processor 310, Memory 320, Display Device 330 and Transceiver 340. Transceiver 340 processes received data into a format that Processor 310 may use and prepares data for transmission. Processor 310, Memory 320, Display Device 330, and Transceiver 340 may be coupled by Bus 390. Data may be transmitted and received via Wireless Antenna 346 and Wired Connection 348. Transceiver 340 includes MAC/PHY 342 and RF segment 344. MAC/PHY 342 provides wireless IP network communication (such as Wi-Fi) via Wireless Antenna 346 and wired communication (such as Ethernet or MoCA) via Wired Connection 348. MAC/PHY 342 supports wireless Wi-Fi connections using 2.4 GHz bands, 5 GHz bands, 6 GHz bands, 60 GHz bands, etc. MAC/PHY 342 implements physical layer functions to provide physical access for signals communicated over a wireless link, and controls transmission/receipt of data packets via Wireless Antenna 346 and Wired Connection 348. MAC/PHY 342 implements physical layer functions to provide physical access for signals. RF segment 344 processes signals for RF transmission and received RF signals. Both Wireless Antenna 346 and Wired Connection 348 may be used for RF signals. Thus, Transceiver 340 includes RF processing to support 802.11 Wi-Fi protocols for communication using 2.4 GHz bands, 5 GHz bands, 6 GHz bands, 60 GHz, etc., as well as Ethernet, Cable TV, Satellite services, MoCA, etc.

Client Device 300 may download code for configuring a Smart Assistant Control Interface 360 that may be presented on a Display Device 330 of the Client Device 300. Smart Assistant Control Interface 360 present information for controlling, managing, and verifying operation of smart assistant devices. Various rules may be configured using the Smart Assistant Control Interface 360 and sent to an Internet access device, such as a gateway or smart media device.

The Smart Assistant Control Interface 360 provides full transparency to show the user which smart assistant devices accessed the internet and when, A gateway analyzes packets associated with the transmissions from all the smart assistant devices and verifies that the smart assistant devices are not sending traffic when they should not be, such as when there is audio and nobody is asking a smart assistant anything. At such times the smart assistant devices should not be sending information to the internet. If the gateway is the guardian of all the monitoring and determinations, then the monitoring of all the smart assistant devices on the premises may be performed independently and shown to the user on the Smart Assistant Control Interface 360.

Smart Assistant Control Interface 360 may display Non-Verbal Input Configuration 362. Access to the Internet by the smart assistant devices through the gateway may be managed based on detecting various inputs by the smart assistant devices, which may include one or more of at least one of a wake word and non-verbal input that are interpreted using Non-Verbal Input Rules 364, and detection of voice inflection associated with a task command as defined by Voice ID & Inflection Rules 365. Non-Verbal Input Rules 364 may define non-verbal input to include input associated with a gesture. Voice Inflection Rules 365 may interpret speech as a question based on intonation of the voice. When speech is determined to be a question based on the Voice Inflection Rules 365, the gateway may open an Internet connection for the smart assistant. Thus, Voice Inflection Rules 365 use intonation of the voice as a wake sound. Also, over a period of time, a smart assistant may only hear one voice. A voice signature may be generated so that different voices may be detected and identified.

Non-Verbal Input Configuration 362 may also include Presence Detection Interpretation Rules 364. The Presence Detection Interpretation Rules 364 define operation of the gateway based on receiving presence information from wireless presence detectors, and cameras. The presence information from the wireless presence detectors, and cameras may be used to identify a source of a task command proximate to the one of one of the one or more smart assistant devices. The presence information enables the gateway to process the task command without receiving a wake word. The presence information may be associated with at least one of Wi-Fi motion detection, Bluetooth proximity detection, Bluetooth low energy detection, RF detection, and camera motion detection. The presence information may also be used to determine a location of the one of the one or more smart assistant devices, and enables the task command to be executed without location information provided with the task command.

If a determination may be made that nobody else is in the room, when speech is detected, a presumption may be made that the intent is that the speech is intended for the smart assistant. This may be enabled as a preference. When a smart assistant is installed and the user is in the room alone, or presence detection indicates that there is nobody else in the room, then speech may be interpreted to be directed to the smart assistant. Presence Detection Interpretation Rules 364 may be based on Wi-Fi motion detection, Bluetooth presence using a Bluetooth beacon and Bluetooth proximity; BLE on a client device that is used to locate the device within 1 meter. Cameras may be used to detect human motion. For example, when a person turns to speak to someone else as opposed to the person looking at the TV with the camera, the smart device may infer that the person is talking to the AI assistant. The Presence Detection Interpretation Rules 364 may be configured so the smart assistant always responds to voice. The Presence Detection Interpretation Rules 364 may present an interface, such as a button, to set a default condition to always respond to voice when a determination is made that the user is alone.

Smart Assistant Control Interface 360 also may display Traffic Analysis Data 366 received from an Internet access device, such as a gateway. Traffic Analysis Data 366 is associated with Internet access by the smart assistant devices. Traffic By Device 368 presents individual traffic data for each smart device. As part of the Traffic Analysis Data 366, Traffic By Device 368 presents individual traffic data for each smart device on the Smart Assistant Control Interface 360.

Location Neutral Interpretation and Distribution Rules 370 are provided via the Smart Assistant Control Interface 360. The Location Neutral Interpretation and Distribution Rules 370 are sent to a gateway, wherein the Location Neutral Interpretation and Distribution Rules 370 define handling task commands that do not identify the location (such as a command of "turn on the lights" when in the kitchen) may be executed based on the location of the source of the command. When distribution information received with a task command from the smart assistant devices, the Location Neutral Interpretation and Distribution Rules 370 are used to control distribution of a task command to a separate device for execution by the separate device.

Active Smart Assistant Indication 372 provides a visual indication of the Internet access status of the smart devices. Other techniques may also be used. Multiple smart assistant devices may be installed on a single device, and each smart assistant may connect to the Internet using the same Internet access device, e.g., gateway, access point, smart media device. A problem may occur when a first person initiates a voice command to a smart device (e.g., Alexa, pay some music), and a second person comes into the room and wants to stop the music, but does not know what device has been activated to play the music. For example, different smart assistant devices may be configured on the same smart device. The second person may say, "Ok Google stop", "Cortana stop", and finally "Alexa stop." To address this problem, one or more of light emitting diodes (LEDs) 392, and at least one speaker 394 may be provided on the Client Device 300. One of the LEDs 392 may be used to represent execution status of each of the smart assistant devices. An audio message may be played through a speaker 394 to indicate the execution status of each of the smart assistant devices.

Command Interpretation Rules 374 are entered for managing Internet access through a gateway by smart assistant devices are entered using the smart assistant control interface. The Command Interpretation Rules 374 are sent to the gateway. Command Interpretation Rules 374 may also be used to define master/slave relationships, such as an input device and a slave device associated with the input device. For example, when a user asks "What is the weather" to a smart assistant, the smart assistant may know that it is associated with a STB with a TV. The STB with the TV may thus act as a slave for the smart assistant. In addition, a gateway may have a slave input device. When a user says "Play some music" to the slave input device, the gateway knows that it is associated with a smart speaker (e.g., an SMD that has a sound bar on it), so the gateway doesn't play the music on its own device, it plays music on the better device, i.e., the smart speaker.

Secure Maintenance Rules 380 may be configured to enable a gateway to interpret a wake word and non-verbal input, and a task command for performing a maintenance operations, wherein the maintenance operation is performed when the wake word and non-verbal input are associated with authorization for performing the maintenance operation.

The Smart Assistant Control Interface 360 shows Wi-Fi status 382 in the home; including whether the smart assistant devices transmitting, whether the cameras are transmitting, or whether a laptop that is off but still sending video frames. The gateway can assess such information through pattern matching or just URLs in terms of header location etc. URL matching can identify that Alexa is access the AWS Cloud, so the URLs detection indicates that Alexa has an open Internet connection. When video is detected coming out of the device, the video is encrypted so all that can be observed is a constant flow associated with identified URLs. From a pattern perspective, a determination may be made that this is video.

The Smart Assistant Control Interface 360 is then used to send a request to the gateway to obtain Internet access status of smart assistant devices. The internet access status of smart assistant devices is presented as Internet Connections Display 384 on the Display Device 330. Execution Control Rules 386 may be entered to define how the gateway device is to handle received task commands.

FIG. 4 illustrates Command Interpretation Rules 400 used for interpreting wake words, task commands, and non-verbal input.

Natural language-controlled devices may be configured to activate command recognition in response to one or more wake words. The Command Interpretation Rules 400 may be displayed and configured in the Smart Assistant Control Interface 360 as shown in FIG. 3, and may be provided to and stored an Internet Access Device, such as a gateway, a SMD, etc., for configuring the Wake Word Detection Engine 230 and Internet Access Manager 240 as shown in FIG. 2.

In FIG. 4, the Command Interpretation Rules 400 include Wake Word Definitions 410, Non-Wake Word Inference Rules 420, Rules for Geographic Neutral Commands 450, Slave Service Execution Rules 452, Rules for Secure Maintenance Operations 454, and Rules for Distribution of Command to Other Smart Assistant Devices 456.

The Wake Word Definitions 410 include Wake Words for Commercially Available Smart Assistant Devices 412, Service Provider Specific Wake Words 414, and Rules for Specific Sounds 416. For example, Rules for Specific Sounds 416 may include Rules for Breaking Glass 418 and Rules for Emergency Sounds 420. Wake Words for Commercially Available Smart Assistant Devices 412 include different wake words that are pre-programmed on a smart assistant by their different manufacturers. The presence of such a word or phrase is intended by the manufacturers to signal that the user intends to interact with the device by issuing a command that will be processed via the device. Service Provider Specific Wake Words 414 include words or phrased that a service provider, such as "show menu", "show balance", etc., may be programmed by the service provider to provide services specific for that service provider. A smart assistant may also listen to ambient noise in your home for particular sounds that may indicate an emergency where the user is unable to utter a wake word and a command or may want to use a shortcut to engage emergency services. Examples of such specific sounds that may be use include Rules for Breaking Glass 418 and Rules for Emergency Sounds 420. One instance of an emergency may occur when someone breaks a window or glass door to break into a home. Rules for Breaking Glass 418 may be defined so that a user that is not home, or is fearful of moving to a room having a smart assistant close to the source of the breaking glass may have the smart assistant contact police or other emergency services to automatically request help. Another example is when a user wants to request emergency support but don't want to try to utter a wake word along with a command that summons help. In this situation, a simple wale word, such as "help" may be preprogrammed to summon help.

Non-Wake Word Inference Rules 430 may include Rules Based on Presence Detection 432, Rules for Gesture Identification 434, and Rules Based on Detecting Voice Inflection 436. Rules Based on Presence Detection 432 may include Rules for Wi-Fi Motion Detection 438, Rules for Bluetooth/BLE Motion Detection 440, and Rules for Camera Detected Motion 442. Rules Based on Presence Detection 432 may be configured through use of the Command Interpretation Rules in the smart assistant control interface. The presence information may also be used to determine a location of the one of the one or more smart assistant devices, and enables the task command to be executed without location information provided with the task command. Rules Based on Presence Detection 432 define operation based on receiving presence information from one of the one or more smart assistant devices identifying a source of a task command proximate to the one of one of the one or more smart assistant devices, wherein the presence information enables processing of a task command without receiving a wake word and non-verbal input. Rules for Wi-Fi Motion Detection 438 may be defined for uses with Wi-Fi motion detection. Rules for Bluetooth/BLE Motion Detection 440 may be defined for uses with Bluetooth proximity detection, and Bluetooth low energy detection. Rules for Camera Detected Motion 442 are defined by a user to sue with camera motion detection. Rules for Gesture Identification 434 may be defined based on visual clues such as gestures including the waving of hands or other facial expressions. A camera may be used to recognize these gestures and communicate a command that is associated with a gesture defined in the Rules for Gesture Identification 434. Rules Based on Detecting Voice Inflection 436 may be defined for interpreting speech as a question based on intonation of the voice. When speech is determined to be a question based on the Rules Based on Detecting Voice Inflection 436, the gateway may open an Internet connection for the smart assistant. Thus, Rules Based on Detecting Voice Inflection 436 use intonation of the voice as a wake sound.

Rules for Geographic Neutral Commands 450 may be defined so that the location of a target of the command is not provided. For example, when a user is detected to be in a kitchen, the user may simply say "turn on the lights to have the lights in the kitchen turned on. It is not necessary for the user to identify the location associated with a command, such as "turn on the lights in the kitchen." Slave Service Execution Rules 452 define relationships between smart assistant devices, Internet access devices such as a gateway, smart speakers, smart input device, smart TV, etc. For example, when a user asks "What is the weather" to a smart assistant, the smart assistant may know that it is associated with a STB with a TV. The STB with the TV may thus act as a slave for the smart assistant. In addition, a gateway may have a slave input device. When a user says "Play some music" to the slave input device, the gateway knows that it is associated with a smart speaker (e.g., an SMD that has a sound bar on it), so the gateway doesn't play the music on its own device, it plays music on the better device, i.e., the smart speaker. Rules for Secure Maintenance Operations 454 define rules for performing maintenance operations. For example, a wake word or non-verbal input, and a task command that is defined to be associated with performing a maintenance operation may be given for performing the maintenance operation. The maintenance operation is performed when the wake word or non-verbal input are associated with authorization for performing the maintenance operation. Maintenance operations may include, for example, modifying policy changes, downloading firmware upgrade, configuring device IP parameters, etc. Rules for Distribution of Command to Other Smart Assistant Devices 456 define how a command is to be distributed among smart devices. Rules for Distribution of Command to Other Smart Assistant Devices 456 control how a command is distributed from the one or more smart assistant devices to a separate device for execution by the separate device.

Figure 5:
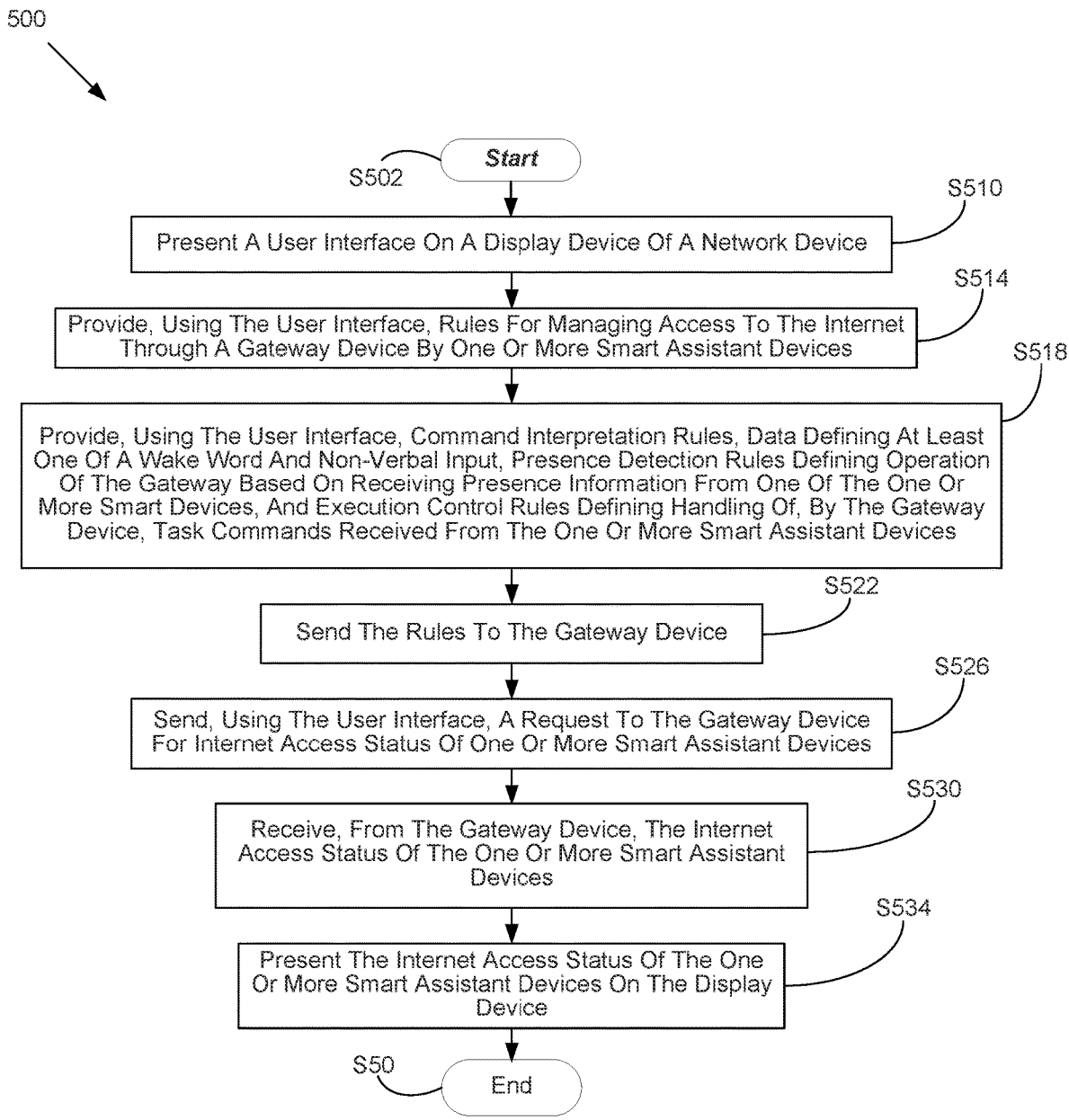
FIG. 5 illustrates a flow chart of a method for managing opening a connection to the Internet by smart assistant devices.

FIG. 5 illustrates a flow chart 500 of a method for managing opening a connection to the Internet by smart assistant devices. In FIG. 5, method 500 starts (S502), and a user interface is presented on a display device of a network device (S510). Referring to FIG. 3, Client Device 300 may download code for configuring a Smart Assistant Control Interface 360 that may be presented on a Display Device 330 of the Client Device 300. The user interface is used to provide rules for managing access to the internet through a gateway device by one or more smart assistant devices (S514). Referring to FIG. 3, Smart Assistant Control Interface 360 present information for controlling, managing, and verifying operation of smart assistant devices. Various rules may be configured using the Smart Assistant Control Interface 360 and sent to an Internet access device, such as a gateway or smart media device.

The user interface is used to provide command interpretation rules, data defining at least one of a wake word and non-verbal input, presence detection rules defining operation of the gateway based on receiving presence information from one of the one or more smart devices, and execution control rules defining handling of, by the gateway device, task commands received from the one or more smart assistant devices (S518). FIG. 3 illustrates that the Smart Assistant Control Interface 360 may include Command Interpretation Rules 374 for managing Internet access through a gateway by smart assistant devices are entered using the smart assistant control interface. Referring to FIG. 4, Wake Word Definitions 410 include Wake Words for Commercially Available Smart Assistant Devices 412, Service Provider Specific Wake Words 414, and Rules for Specific Sounds 416. For example, Rules for Specific Sounds 416 may include Rules for Breaking Glass 418 and Rules for Emergency Sounds 420. Rules Based on Presence Detection 432 may include Rules for Wi-Fi Motion Detection 438, Rules for Bluetooth/BLE Motion Detection 440, and Rules for Camera Detected Motion 442. Referring again to FIG. 3, Execution Control Rules 386 may be entered to define how the gateway device is to handle received task commands.

The rules are sent to the gateway device (S522). Referring to FIG. 3, various rules may be configured using the Smart Assistant Control Interface 360 and sent to an Internet access device, such as a gateway or smart media device. The user interface is used to send a request to the gateway device for internet access status of one or more smart assistant devices (S526). Referring to FIG. 3, the Smart Assistant Control Interface 360 is then used to send a request to the gateway to obtain Internet access status of smart assistant devices.

The internet access status of the one or more smart assistant devices is received from the gateway device (S530). FIG. 3 illustrates that the Smart Assistant Control Interface 360 may also display Traffic Analysis Data 366 received from an Internet access device, such as a gateway. Traffic Analysis Data 366 is associated with Internet access by the smart assistant devices. Referring to FIG. 2, Processor 210 uses Traffic Analysis 212 to obtain Internet access status of one or more smart assistant devices for presentation on a display device of the smart assistant control interface implemented on the wireless client device. The internet access status of the one or more smart assistant devices are presented on the display device (S534). Referring back to FIG. 3, the internet access status of smart assistant devices is presented as Internet Connections Display 384 on the Display Device 330. Thereafter, the method ends (S550).

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device in a network, comprising:
a memory storing computer-readable instructions; and
a processor configured to execute the computer-readable instructions to:
present a user interface on a display device of the network device;
provide, on the user interface, rules for managing Internet access through a gateway device in the network by one or more smart assistant devices in the network, wherein the rules define master/slave relationships, wherein the rules include one or more presence detection rules defining operation of the gateway device based on receiving presence information from one of the one or more smart assistant devices identifying a source of a task command proximate to the one of one of the one or more smart assistant devices, the presence information enabling the gateway device to process the task command without receiving the at least one of a wake word and non-verbal input;
send the rules to the gateway device;
send, using the user interface, a request to the gateway device for Internet access status of one or more smart assistant devices;
in response to the request, receive, from the gateway device, the Internet access status of the one or more smart assistant devices; and
present the Internet access status of the one or more smart assistant devices on the display device.

2. The network device of claim 1, wherein the Internet access status includes traffic information associated with Internet access by the one or more smart assistant devices.

3. The network device of claim 1 further comprising one or more of light emitting diodes (LEDs), and at least one speaker, wherein the Internet access status of the one or more smart assistant devices is presented using one or more of the LEDs representing execution status of each of the one or more smart assistant devices, a visual indication on the display device of the execution status of each of the one or more smart assistant devices, and an audio message played through the at least one speaker to indicate the execution status of each of the one or more smart assistant devices.

4. The network device of claim 1, wherein the processor is further configured to execute the computer-readable instructions to manages access to the Internet by the one or more smart assistant devices through the gateway device based on detecting voice inflection associated with a task command.

5. The network device of claim 1, wherein the processor is further configured to execute the computer-readable instructions to manages the Internet access by the one or more smart assistant devices via the gateway device by receiving, via the user interface, command interpretation rules including data defining at least one of a wake word and non-verbal input, and providing, to the gateway device, the command interpretation rules.

6. The network device of claim 5, wherein the non-verbal input comprises at least one of input associated with a gesture.

7. The network device of claim 5, wherein the processor is further configured to execute the computer-readable instructions to receive execution control rules via the user interface, and send the execution control rules to the gateway device, wherein the execution control rules define handling of, by the gateway device, distribution information received with a task command from the one or more smart assistant devices, the distribution information defining distribution of the task command to a separate device for execution by the separate device.

8. The network device of claim 1, wherein the presence information is associated with at least one of Wi-Fi motion detection, Bluetooth proximity detection, Bluetooth low energy detection, RF detection, and camera motion detection.

9. The network device of claim 1, wherein the presence information determines a location of the one of the one or more smart assistant devices, and enables the task command to be executed without location information provided with the task command.

10. The network device of claim 1, wherein the Internet access status indicates receipt, by the gateway device, of at least one of a wake word and non-verbal input, and a task command for performing a maintenance operation, the maintenance operation performed when the at least one of the wake word and non-verbal input are associated with authorization for performing the maintenance operation.

11. A method for managing one or more smart assistant devices in a network, comprising:
presenting a user interface on a display device of a network device in the network;
providing, on the user interface, rules for managing Internet access through a gateway device in the network by one or more smart assistant devices, wherein the rules define master/slave relationships, wherein the rules include one or more presence detection rules defining operation of the gateway device based on receiving presence information from one of the one or more smart assistant devices identifying a source of a task command proximate to the one of one of the one or more smart assistant devices, the presence information enabling the gateway device to process the task command without receiving the at least one of a wake word and non-verbal input;
sending the rules to the gateway device;
sending, using the user interface, a request to the gateway device for Internet access status of one or more smart assistant devices;
in response to the request, receiving, from the gateway device, the Internet access status of the one or more smart assistant devices; and
presenting the Internet access status of the one or more smart assistant devices on the display device.

12. The method of claim 11 further comprising presenting execution status of a task command by each of the one or more smart assistant devices using one or more of at least one LED on the network device, a visual indication on the display device of the execution status of each of the one or more smart assistant devices, and an audio message played through at least one speaker of the network device to indicate the execution status of each of the one or more smart assistant devices.

13. The method of claim 11, wherein the sending the rules to the gateway device further comprises sending command interpretation rules including a rule defining voice inflection detection associated with a task command, and data defining at least one of a wake word and non-verbal input, wherein the non-verbal input comprises at least one of input associated with a gesture.

14. The method of claim 11 further comprises receiving execution control rules via the user interface, and sending the execution control rules to the gateway device, wherein the execution control rules define handling of, by the gateway device, distribution information received with a task command from the one or more smart assistant devices, the distribution information defining distribution of the task command to a separate device for execution by the separate device.

15. A non-transitory computer-readable media of a network device in a network having computer-readable instructions stored thereon, which when executed by a processor causes the processor to perform operations comprising:
presenting a user interface on a display device of the network device;
providing, on the user interface, rules for managing Internet access through a gateway device in the network by one or more smart assistant devices in the network, wherein the rules define master/slave relationships, wherein the rules include one or more presence detection rules defining operation of the gateway device based on receiving presence information from one of the one or more smart assistant devices identifying a source of a task command proximate to the one of one of the one or more smart assistant devices, the presence information enabling the gateway device to process the task command without receiving the at least one of a wake word and non-verbal input;
sending the rules to the gateway device;
sending, using the user interface, a request to the gateway device for Internet access status of one or more smart assistant devices;
in response to the request, receiving, from the gateway device, the Internet access status of the one or more smart assistant devices; and
presenting the Internet access status of the one or more smart assistant devices on the display device.

16. The non-transitory computer-readable media of claim 15, wherein the computer-readable instructions when executed by the processor cause the processor to perform operations further comprising presenting execution status of a task command by each of the one or more smart assistant devices using one or more of at least one LED on the network device, a visual indication on the display device of the execution status of each of the one or more smart assistant devices, and an audio message played through at least one speaker of the network device to indicate the execution status of each of the one or more smart assistant devices.

17. The non-transitory computer-readable media of claim 15, wherein the sending the rules to the gateway device further comprises sending command interpretation rules including a rule defining voice inflection detection associated with a task command, data defining at least one of a wake word and non-verbal input, wherein the non-verbal input comprises at least one of input associated with a gesture.

18. The non-transitory computer-readable media of claim 15, wherein the computer-readable instructions when executed by the processor cause the processor to perform operations further comprising receiving execution control rules via the user interface, and sending the execution control rules to the gateway device, wherein the execution control rules define handling of, by the gateway device, distribution information received with a task command from the one or more smart assistant devices, the distribution information defining distribution of the task command to a separate device for execution by the separate device.

19. The network device of claim 1, wherein the processor is further configured to execute the computer-readable instructions to:
receive traffic analysis data from the gateway device, wherein the traffic analysis data is associated with the Internet access;
use traffic analysis data to obtain the Internet access status; and
display the Internet access status, the traffic analysis data or both on the display device.

20. The non-transitory computer-readable media of claim 15, wherein the computer-readable instructions when executed by the processor cause the processor to perform operations comprising:
receiving traffic analysis data from the gateway device, wherein the traffic analysis data is associated with the Internet access;
using traffic analysis data to obtain the Internet access status; and
displaying the Internet access status, the traffic analysis data or both on the display device.

* * * * *